United States Patent
Vaidya et al.

(10) Patent No.: US 8,194,622 B2
(45) Date of Patent: Jun. 5, 2012

(54) METHOD AND SYSTEM FOR MANAGING COMMUNICATION BETWEEN A BASE STATION AND SUBSCRIBER STATIONS

(75) Inventors: Samir S. Vaidya, Highland Park, NJ (US); Kalvyn T. Rasquinha, Streamwood, IL (US); Jun Wang, Evanston, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1074 days.

(21) Appl. No.: 11/954,255

(22) Filed: Dec. 12, 2007

(65) Prior Publication Data

US 2009/0154429 A1 Jun. 18, 2009

(51) Int. Cl.
*H04J 3/00* (2006.01)
*H04B 7/212* (2006.01)
(52) U.S. Cl. .................. 370/336; 370/345; 370/348
(58) Field of Classification Search .............. 370/336
See application file for complete search history.

(56) References Cited

U.S. PATENT DOCUMENTS 6,034,967 A * 3/2000 Citta et al. .................... 370/443
7,012,900 B1 3/2006 Riddle
2005/0286449 A1 12/2005 Seo et al.
2006/0281476 A1 * 12/2006 Lane et al. .................... 455/502
2007/0218948 A1 9/2007 Kurokawa

OTHER PUBLICATIONS

IEEE Standard for local and metropolitan area networks, Part 16: Air Interface for Fixed and Mobile Broadband Wireless Access Systems, Amendment 2: Physical and Medium Access Control Layers for Combined Fixed and Mobile Operation in License Bands, IEEE Std. 802.16e-2005 and IEEE Std. 802.16/2004/Cor1-2005 (Amendment and Corrigendum to IEEE Std 802.16-2004), Feb. 28, 2006, pp. 182-184, 317, 356-357.

* cited by examiner

*Primary Examiner* — Kenny Lin
*Assistant Examiner* — Shripal Khajuria

(57) ABSTRACT

A method and system for managing a communication between a base station (102) and plurality of subscriber stations (104, 106, 108 and 110) is disclosed. The method includes determining (504) whether a Round Trip Delay (RTD) component is greater than the duration of a data slot for at least one subscriber station of the plurality of subscriber stations. The RTD component is a part of a Transmit/receive Transition Gap (TTG) of the base station. The method also includes scheduling (506) the data slot for the at least one subscriber station using the RTD component of the base station when the duration of the RTD component is greater than the duration of the data slot for the at least one subscriber station.

16 Claims, 6 Drawing Sheets

METHOD AND SYSTEM FOR MANAGING COMMUNICATION BETWEEN A BASE STATION AND SUBSCRIBER STATIONS

FIELD OF THE INVENTION

This invention relates generally to communication networks, and more specifically, to a method and system for managing communication between a base station and subscriber stations in a communication network.

BACKGROUND OF THE INVENTION

Communication networks are becoming increasingly popular with the increase in the need for communication and information exchange. A typical communication network includes numerous base stations and subscriber stations. These subscriber stations exchange information with each other via base stations. The subscriber stations exchange data with a base station in a series of frames. Each frame includes, for example, an uplink data frame of data and a downlink data frame of data. The uplink data frame can be defined as a sub-frame, during which the subscriber stations send data to the base station. The downlink data frame can be defined as a sub-frame, during which the base station sends data to the subscriber stations. A typical base station communicates with the subscriber stations by allocating respective data slots to different subscriber stations. These data slots are allocated in the downlink data frame as well as in the uplink data frame.

Generally, base stations and subscriber stations comply with the Institute of Electrical and Electronics Engineers (IEEE) standards 802.16-2004 and/or 802.16-2005. According to section 8.4.4.2 of the IEEE standard 802.16-2004, a Transmit/receive Transition Gap (TTG) and a Receive/transmit Transition Gap (RTG) needs to be inserted between the downlink data frame and uplink data frame, and also at the end of each frame. According to these standards, a base station should not transmit information to a subscriber station later than (Subscriber Station Receive/Transmit Turnaround Gap+Round Trip Delay) before the beginning of the first scheduled uplink allocation in any uplink data frame. Further, the base station should not transmit downlink information to the subscriber station earlier than (Subscriber Station Transmit/Receive Turnaround Gap-RTD) after the end of the allocation in the last uplink data frame.

According to the specifications of the IEEE standards 802.16-2004 and 802.16-2005, TTG is equal to the sum of SSRTG (Subscriber Station Receive/Transmit Turnaround Gap) and RTD (Round Trip Delay). SSRTG and SSTTG (Subscriber Station Transmit/receive Transition Gap) are parameters provided by the subscriber station to the base station when the subscriber station enters the communication network. TTG is a pre-configured value set that corresponds to the base station. The RTD component is a major portion of the TTG. The RTD cannot be changed once the SSRTG has been reported to a base station by a subscriber station. Therefore, bandwidth may be wasted by subscriber stations that are close to the base station, as well as by subscriber stations that are moving closer to the base station, resulting in a decrease in data throughput for the corresponding communication network.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

DETAILED DESCRIPTION

Figure 1:
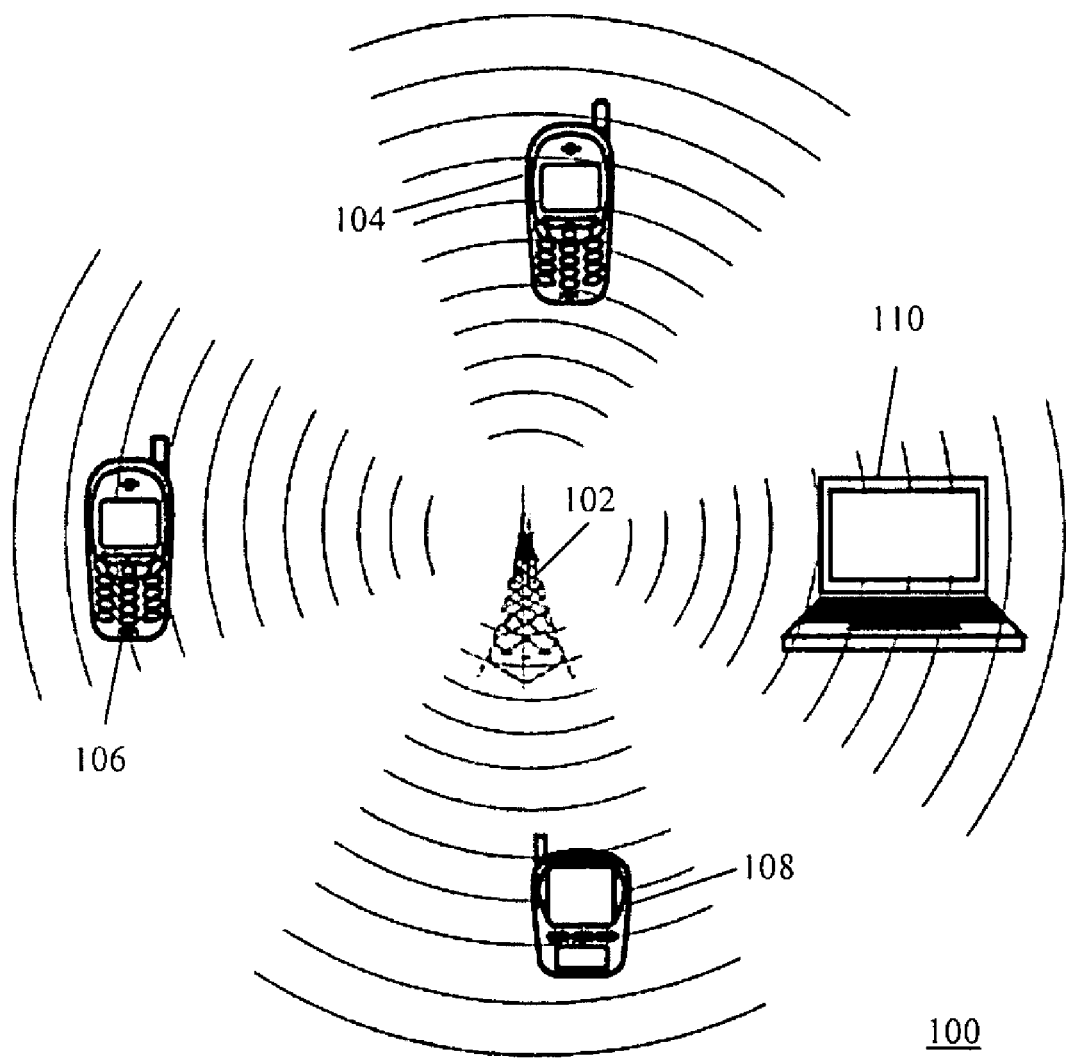
FIG. 1 illustrates an exemplary communication network, in accordance with an embodiment of the present invention.

For one embodiment, a method for managing communication between a base station and a plurality of subscriber stations is provided. The method includes determining whether a Round Trip Delay (RTD) component is greater than the duration of a data slot for at least one subscriber station of the plurality of subscriber stations. The RTD component is a part of a Transmit/receive Transition Gap (TTG) of the base station. The method also includes scheduling the data slot for the at least one subscriber station by using the RTD component when the duration of the RTD component is greater than the duration of the data slot for the at least one subscriber station.

For another embodiment, a base station is provided. The base station includes a scheduling module and a transceiver module. The scheduling module is adapted to schedule a data slot for at least one subscriber station of a plurality of subscriber stations. The scheduling module uses a Round Trip Delay (RTD) component of a Transmit/receive Transition Gap (TTG) of the base station, to schedule the data slot for the at least one subscriber station. The transceiver module is adapted to communicate with the at least one subscriber station, based on the scheduling of the data slot for the at least one subscriber station performed by the scheduling module.

For yet another embodiment, a subscriber station is provided. The subscriber station includes a transceiver module that is adapted to communicate with a base station. The communication can be scheduled to be exchanged in the Round Trip Delay (RTD) component, which is a part of a Transmit/receive Transition Gap (TTG) of the base station.

Before describing in detail the particular method and system for managing a communication between a base station and a plurality of subscriber stations, in accordance with various embodiments of the present invention, it should be observed that the present invention resides primarily in combinations of method steps related to the method for managing communication between the base station and the plurality of subscriber stations. Accordingly, the method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, relational terms such as first and second, and the like, may be used solely to distinguish one entity or action from another entity or action, without necessarily requiring or implying any actual such relationship or order between such entities or actions. The terms "comprises," "comprising", or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element.

The term "another", as used in this document, is defined as at least a second or more. The term "includes", as used herein, is defined as comprising.

FIG. 1 illustrates an exemplary communication network 100, in accordance with one embodiment of the present invention. The communication network 100 can include one or more base stations and a plurality of subscriber stations. Examples of the communication network 100 include, but are not limited to, an Institute of Electrical and Electronics Engineers (IEEE) 802.16-based broadband wireless access network, an Advanced Mobile Phone Systems (AMPS) network, a Global System for Mobile (GSM) communications network, a Digital Cellular Systems (DCS) network, a Universal Mobile Telecommunications Systems (UMTS) network, a Code Division Multiple Access (CDMA) network, and the Internet. For the purpose of this description, the communication network 100 is shown to include a base station 102, a subscriber station 104, a subscriber station 106, a subscriber station 108, and a subscriber station 110. Examples of the subscriber stations 104, 106, 108 and 110 include, but are not limited to, cellular phones, laptop computers, personal digital assistants (PDAs), Internet Protocol (IP)-enabled phones, voice-messaging systems, audio broadcast systems, video broadcast systems, portable gaming systems, and conferencing systems. For example, each of the subscriber stations 104, 106, 108 and 110 exchange data packets with the base stations in a series of frames. Data slot is allocated for the subscriber stations 104, 106, 108 and 110 in each frame. The frames can include one or more sub-frames that are referred to as a downlink data frame and an uplink data frame. The downlink data frame includes the data slots corresponding to the each of the plurality of subscriber stations 104, 106, 108 and 110. These data slots contain information that is to be sent to the subscriber stations 104, 106, 108 and 110 from the base station 102. For example, the uplink data frame includes the data slots corresponding to each of the plurality of subscriber stations 104, 106, 108 and 110. These data slots include information that is to be sent to the base station 102 from the subscriber stations 104, 106, 108 and 110. Each of the subscriber stations 104, 106, 108 and 110 exchange data with the base station 102 in their respective data slots in the uplink data frame and the downlink data frame. The allocation of the frames for each of the subscriber stations is explained further in conjunction with FIG. 4.

Figure 2:
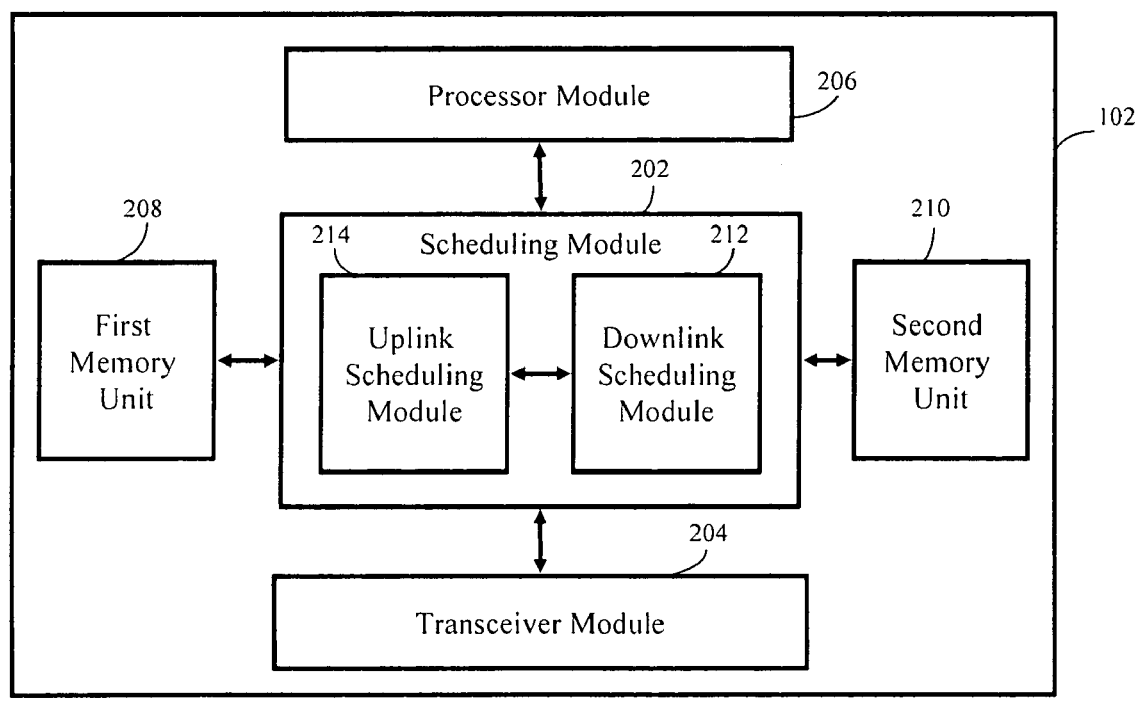
FIG. 2 is a block diagram illustrating a base station for managing communication with a plurality of subscriber stations, in accordance with an embodiment of the present invention.

FIG. 2 is a block diagram illustrating the base station 102 for managing communication with the plurality of subscriber stations 104, 106, 108 and 110, in accordance with one embodiment of the present invention. The base station 102 includes a scheduling module 202, a transceiver module 204, a processor module 206, a first memory unit 208, and a second memory unit 210. The scheduling module 202 includes a downlink scheduling module 212 and an uplink scheduling module 214. The downlink scheduling module 212 schedules data slots for the at least one subscriber station in a downlink data frame. The downlink scheduling module 212 is configured such that it can schedule at least one data slot for a subscriber station by using the Round Trip Delay (RTD) component of the Transmit/receive Transition Gap (TTG) of the base station 102. The scheduling of the at least one data slot is explained in detail in conjunction with FIG. 4. The uplink scheduling module 214 schedules a data slot for the at least one subscriber in an uplink data frame. The uplink scheduling module 214 is configured such that it can schedule at least one data slot for a subscriber station by using the RTD component of the TTG of the base station 102.

The transceiver module 204 is adapted to communicate with the subscriber stations 104, 106, 108 and 110, based on the scheduling of the respective data slots for the subscriber stations 104, 106, 108 and 110. It will be apparent to a person ordinarily skilled in the art that the transceiver module 204 can be a combination of a receiver and a transmitter or can be a single entity with a receiver and a transmitter. The downlink scheduling module 212 and uplink scheduling module 214 work in conjunction with the processor module 206. The processor module 206 determines whether the duration of the RTD component of the TTG of the base station 102 for a subscriber station is greater than the duration of the data slot required for the subscriber station. The processor module 206 is also adapted to maintain a gap between the data slots for the subscriber station in the uplink data frame and the data slots in the downlink data frame so that they are equal to the TTG.

The working of the base station 102 is explained with the following example, for clarity. Consider a situation in which the duration of the data slot for a subscriber station is 20 μs, the TTG of the base station is 80 μs, the SSRTG is equal to 50 μs. As a result, the RTD is equal to 30 μs (RTD=TTG−SSRTG). In this event, the duration of the RTD component (30 μs) is greater than the data slot (20 μs) for the subscriber station 104. Therefore, data slots for the subscriber station can be inserted in the uplink data frame and the downlink data frame, maintaining a gap of 50 μs, which is equal to the SSRTG. In other words, the duration of RTD (30 μs) can be utilized to insert an additional data slot for the subscriber station in either the uplink data frame or the downlink data frame.

In one embodiment, the minimum gap required between the data slot of the subscriber station in the uplink data frame and the downlink data frame can be maintained with the help of the first memory unit 208 and the second memory unit 210. The first memory unit 208 is used to store downlink scheduling information. The downlink data frame-scheduling information refers to the scheduling of data slots for one or more subscriber stations of the plurality of subscriber stations in the downlink data frame. The second memory unit 210 is used to store uplink scheduling information. The uplink data frame-scheduling information refers to the scheduling of a set of data slots for the one or more subscriber stations of the plurality of subscriber stations in the uplink data frame. The first memory unit 208 and the second memory unit 210 communicate the uplink scheduling information and the downlink scheduling information to the processor module 206. The processor module 206 maintains a minimum gap of TTG between the data slots for every subscriber station in the uplink data frame and the downlink data frame, based on the uplink scheduling information and the downlink scheduling information. In one embodiment, the first memory unit 208 and the second memory unit 210 can be integrated and can store the uplink scheduling information and the downlink scheduling information. In some embodiments, the base station 102 communicates with the subscriber stations 104, 106, 108 and 110, in compliance with, but not limited to, IEEE standards 802.16-2004 and/or 802.16-2005.

Figure 3:
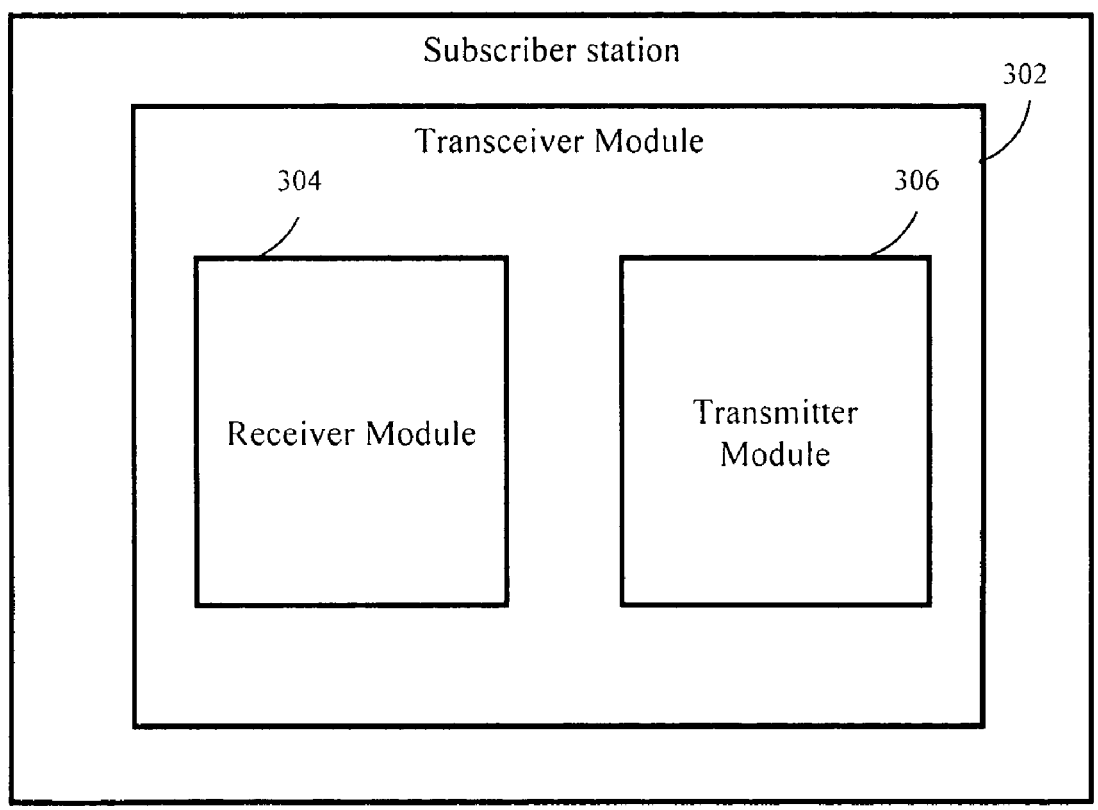
FIG. 3 is a block diagram illustrating a subscriber station for managing communication with a base station, in accordance with an embodiment of the present invention.

FIG. 3 is a block diagram illustrating the subscriber station 104 for managing a communication with the base station 102, in accordance with one embodiment of the present invention. The subscriber station 104 includes a transceiver module 302, which exchanges data with the base station 102. The transceiver module 302 can be adapted to exchange the data with the base station 102 when the data is scheduled to be exchanged in the RTD component of the TTG gap of the base station. For one embodiment, the transceiver module 302 includes a receiver module 304 and a transmitter module 306.

The receiver module 304 is configured to receive the data from the base station 102 such that it can receive the data that is scheduled to be sent in the downlink data frame by using the RTD component of the TTG of the base station 102. The transmitter module 306 is configured to transmit data to the base station 102. Moreover, the transmitter module 306 is configured such that the data sent by it can be received by the base station 102 in an uplink data frame by using the RTD component of the TTG of the base station 102. The receiver module 304 and the transmitter module 306 operates in coordination with each other, to maintain that the gap between the data received by the receiver module 304 and the data transmitted by the transmitter module 306 is at least equal to the TTG of the base station 102. In some embodiments, the subscriber station 104 communicates with the base station 102, in compliance with, but not limited to, IEEE standard 802.16-2004 and/or IEEE standard 802.16-2005.

Figure 4:
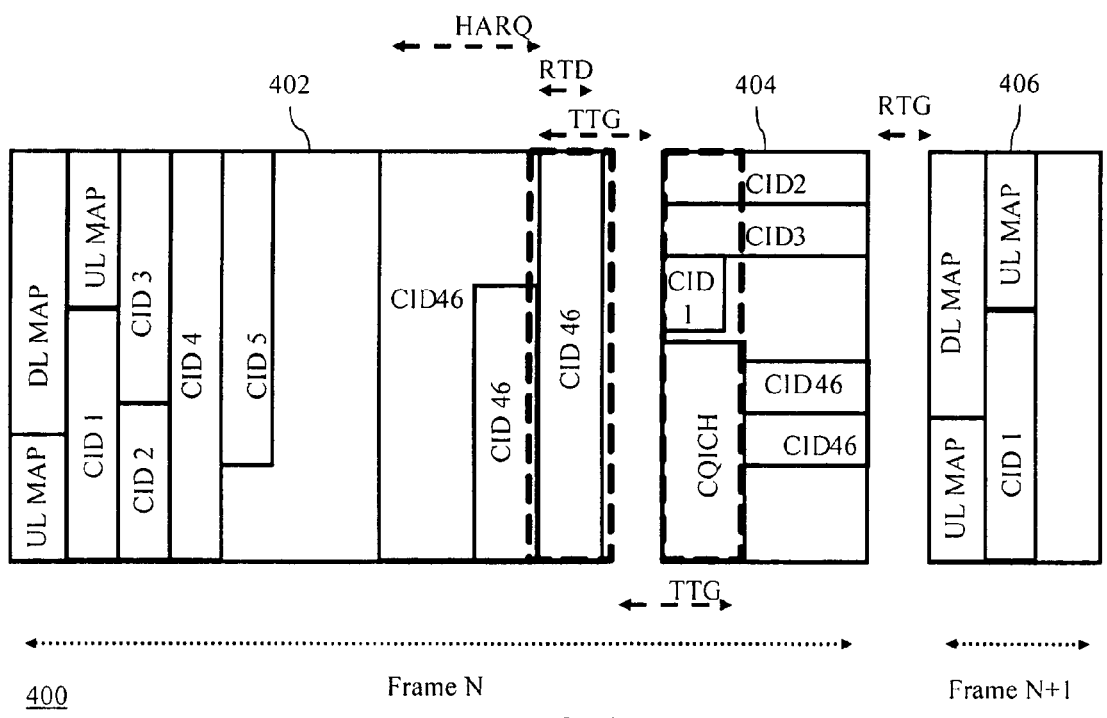
FIG. 4 is a schematic diagram illustrating an architecture of frame structure for managing communication between a base station and a plurality of subscriber stations, in accordance with an embodiment of the present invention.

FIG. 4 is a schematic diagram illustrating an architecture 400 of the frame structure for managing communication between the base station 102 and the plurality of subscriber stations 104, 106, 108 and 110, in accordance with one embodiment of the present invention. The architecture 400 represents the architecture of the two generic frames N and N+1 corresponding to the base station 102, where N is an integer number and is greater than zero. Frame N includes a downlink data frame 402 and an uplink data frame 404. For the purpose of this description, frame N+1 is shown to include a downlink data frame 406 only. The downlink data frame 402 includes an Up Link (UL), a Down Link (DL) map, and several data bursts with different Connection Identifiers (CIDs). The UL map describes a Medium Access Control (MAC) message that defines the UL data burst locations in the UL data frame for subscribers identified by CIDs. The DL map describes a MAC message that defines the DL data burst locations in the DL data frame for subscribers identified by CIDs.

The several CIDs represent the respective CIDs for each of the subscriber stations associated with the base station 102. CID is a term used in IEEE 802.16 networks to specify a unidirectional MAC-layer address that identifies a connection between a base station and a subscriber station. As shown in FIG. 4, the downlink data frame 402 includes CID1, CID2, CID3, CID4 and CID5 to CID46, where $CID_i$ represents the CID allocation of $i^{th}$ subscriber station ($i \geq 1$ and i is an integer). $CID_i$ represents the connection between the $i^{th}$ subscriber station and the base station 102 through which the data packets are routed.

As shown in FIG. 4, the uplink data frame 404 occurs subsequent to the downlink data frame 402. The uplink data frame 404 includes a Channel Quality Information Channel (CQICH) control field and uplink data bursts for CID1, CID2, and CID3 to CID46. It will be apparent to a person ordinarily skilled in the art (from FIG. 4) that the minimum gap between the boundaries of the data bursts for CID 46 in the downlink data frame 402 and the uplink data frame 404 is the TTG, which is a prerequisite according to IEEE 802.16. 2004. For example, the data slots for the CID 46 in the downlink data frame 402 and the uplink data frame 404 are allocated in a way that the RTD gap is utilized to insert a data slot for the CID 46. In addition, the minimum gap criterion is also fulfilled for the $46^{th}$ subscriber station. For example, the gap between the CIDs in the uplink data frame and the down link data frame for a subscriber station should be TTG. In other words, the RTD gap is re-used for data transmission. From the description given above, it will be apparent to a person ordinarily skilled in the art that if the data slots for a subscriber station in the downlink data frame and in the uplink data frame are arranged, so that the gap between them is equal or more than the RTD time, the base station and/or subscriber stations can re-use the RTD time for data-burst transmission.

The frame N+1 406 shown in FIG. 4 includes a UL map, a DL map and a CID1. The duration between the frame N and the frame N+1 is represented as the RTG (Receive/Transmit Transition Gap). For one embodiment, the frame N+1 is a downlink data frame. It will be apparent to person skilled in the art that the there will be an uplink data frame subsequent to the downlink data frame for the frame N+1 406 (not shown in FIG. 4).

Figure 5:
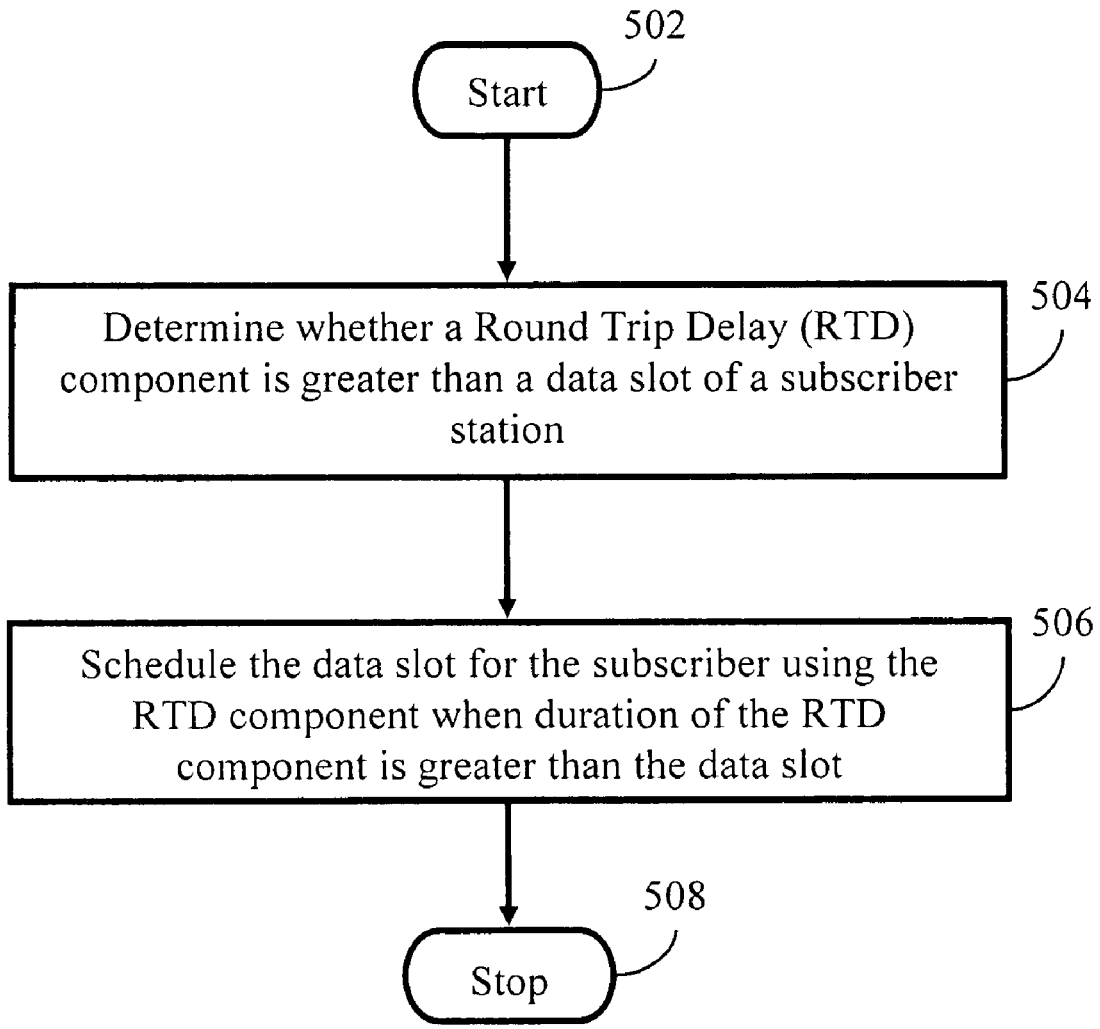
FIG. 5 is a flow diagram illustrating a method for managing communication between a base station and a plurality of subscriber stations, in accordance with an embodiment of the present invention.

FIG. 5 is a flow diagram illustrating a method for managing communication between the base station 102 and the plurality of subscriber stations 104, 106, 108 and 110, in accordance with one embodiment of the present invention. The method for managing the communication between the base station 102 and the subscriber stations 104, 106, 108 and 110 is initiated at step 502. At step 504, it is determined whether an RTD component is greater than a data slot of a subscriber station of the subscriber stations 104, 106, 108 and 110. The RTD component is a part of the TTG of the base station 102. At step 506, the data slots for the subscriber station are scheduled in the downlink data frame 402 and the uplink data frame 404. In one embodiment, the scheduling of the data slots for the subscriber station is carried out, based on the condition that the RTD component is greater than the data slot required for the subscriber station. The data slots for the subscriber station are scheduled by using the RTD component. At step 508, the method for managing communication between a base station and a plurality of subscriber stations is terminated.

Figure 6:
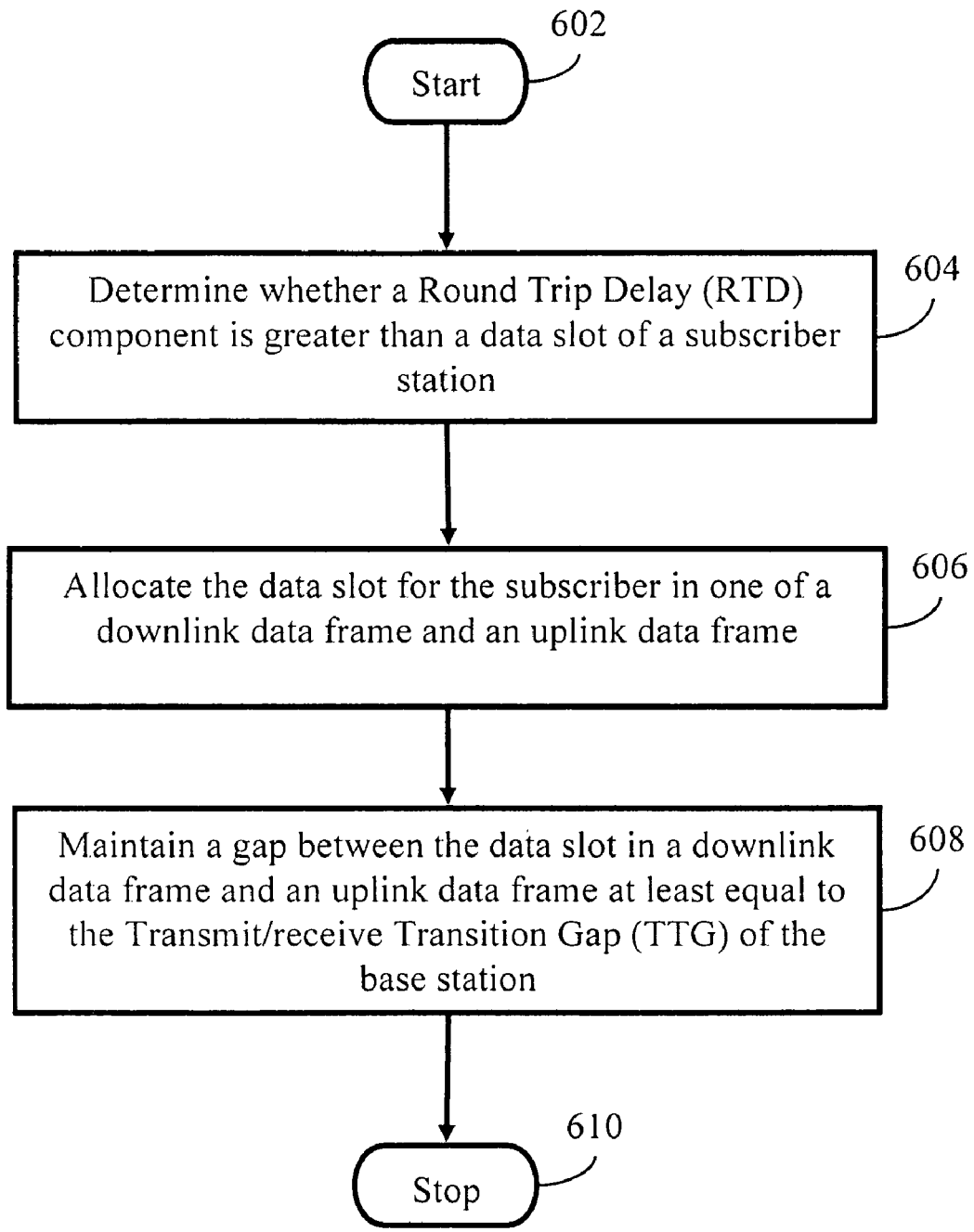
FIG. 6 is a detailed flow diagram illustrating a method for managing communication between a base station and a plurality of subscriber stations, in accordance with an embodiment of the present invention.

FIG. 6 is a detailed flow diagram illustrating a method for managing communication between a base station and a plurality of subscriber stations, in accordance with one embodiment of the present invention. The method is initiated at step 602. The step 604 being performed for managing the communication between the base station 102 and the plurality of subscriber stations 104, 106, 108 and 110 is the same as the step 504, as discussed in conjunction with FIG. 5. At step 606, the data slots for the subscriber station are allocated in the uplink data frame and the downlink data frame. The scheduling of the data slots for the subscriber station in the downlink data frame is performed in coordination with the scheduling in the uplink data frame. At step 608, a gap is maintained between the data slots for the subscriber station in the uplink data frame 404 and the downlink data frame 402, which is at least equal to the TTG of the base station. In some embodiments, the communication between the base station 102 and the subscriber stations 104, 106, 108 and 110 is in compliance with at least IEEE standards 802.16-2004 or 802.16-2005. At step 610, a method for managing communication between a base station and a plurality of subscriber stations is terminated.

The method given above is explained with the following example, for added clarity. Consider an exemplary case in which the duration of a data slot required for a subscriber station is 20 µs and the TTG of the base station is 80 µs (the SSRTG is equal to 50 µs and the RTD is equal to 30 µs). In this case, the duration of the RTD component (30 µs) is greater than the data slot (20 µs) required for the subscriber station 104. The data slots for the subscriber station can be inserted in the uplink data frame and the downlink data frame while maintaining a gap of 50 µs, which is equal to the SSRTG. In other words, the duration of RTD (30 µs) can be utilized to insert an additional data slot for the subscriber station in either the uplink data frame or the downlink data frame.

Various embodiments, as described above, provide a method and system for managing communication between a base station and a plurality of subscriber stations. Embodiments of the present invention enable an increase in the available bandwidth and the system throughput by creating additional data slots in the transmitting data frames. Embodiments of the present invention may be implemented without any change in the IEEE standard 802.16-2004 or IEEE standard 802.16-2005.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems and any element(s) that may cause any benefit, advantage or solution to occur or become more pronounced are not to be construed as critical, required or essential features or elements of any or all of the claims. The invention is defined solely by the appended claims, including any amendments made during the pendency of this application and all equivalents of those claims, as issued.

What is claimed is:

1. A method for managing a communication between a base station and a plurality of subscriber stations, the method comprising:
    determining whether a Round Trip Delay (RTD) component is greater than a duration of a data slot for at least one subscriber station of the plurality of subscriber stations, wherein the RTD component is a part of a Transmit/receive Transition Gap (TTG) of the base station; and
    utilizing the RTD component to insert the data slot for the at least one subscriber station into a data frame when the duration of the RTD component is greater than the duration of the data slot for the at least one subscriber station.

2. The method as recited in claim 1, wherein utilizing the RTD component to insert the data slot for the at least one subscriber station into a data frame comprises allocating the data slot in one of a downlink data frame and an uplink data frame.

3. The method as recited in claim 2, wherein utilizing the RTD component to insert the data slot for the at least one subscriber station into a data frame comprises maintaining a gap between the data slot in the downlink data frame and the data slot in the uplink data frame to be at least equal to the TTG of the base station.

4. The method as recited in claim 1, wherein the communication between the base station and the plurality of subscriber stations is in compliance with at least one of Institute of Electrical and Electronics Engineers (IEEE) standard 802.16-2004 and IEEE standard 802.16-2005.

5. A base station comprising:
    a scheduling module, the scheduling module adapted to schedule a data slot by utilizing a Round Trip Delay (RTD) component for inserting the data slot into a data frame for at least one subscriber station of a plurality of subscriber stations, wherein the RTD component is a part of a Transmit/receive Transition Gap (TTG) of the base station; and
    a transceiver module, the transceiver module adapted to communicate with the at least one subscriber station based on the scheduling of the data slot for the at least one subscriber station.

6. The base station as recited in claim 5, wherein the scheduling module comprises:
    a downlink scheduling module, the downlink scheduling module adapted to schedule the data slot for the at least one subscriber station in a downlink data frame using the RTD component of the base station.

7. The base station as recited in claim 5, wherein the scheduling module comprises:
    an uplink scheduling module, the uplink scheduling module adapted to schedule the data slot for the at least one subscriber station in an uplink data frame using the RTD component of the base station.

8. The base station as recited in claim 5 further comprising:
    a processor module, the processor module adapted to determine whether a duration of the RTD component is greater than a duration of the data slot for the at least one subscriber station.

9. The base station as recited in claim 8, wherein the processor module is further adapted to maintain a gap between the data slot for the at least one subscriber station in a downlink data frame and the data slot for the at least one subscriber station in an uplink data frame at least equal to the TTG.

10. The base station as recited in claim 5 further comprising a first memory unit to store downlink data frame scheduling information, wherein the downlink data frame scheduling information includes scheduling of a set of data slots for one or more subscriber stations of the plurality of subscriber stations in a downlink data frame.

11. The base station as recited in claim 5 further comprising a second memory unit to store uplink data frame scheduling information, wherein the uplink data frame scheduling information includes scheduling of a set of data slots for one or more subscriber stations of the plurality of subscriber stations in a uplink data frame.

12. The base station as recited in claim 5, wherein the base station communicates with the at least one subscriber station in compliance with at least one of Institute of Electrical and Electronics Engineers (IEEE) standard 802.16-2004 and IEEE standard 802.16-2005.

13. A subscriber station comprising:
    a transceiver module, the transceiver module adapted to exchange data with a base station, wherein a Round Trip Delay (RTD) component is utilized to insert the data into a data frame to be exchanged with the base station, wherein the RTD component is a part of a Transmit/receive Transition Gap (TTG) of the base station.

14. The subscriber station as recited in claim 13, wherein the transceiver module comprises:
    a receiver module, the receiver module adapted to receive a downlink portion of the data from the base station, wherein the downlink portion of the data is inserted in a downlink data frame based on the RTD component of the base station; and a transmitter module, the transmitter module adapted to transmit an uplink portion of the data to the base station, wherein the data is inserted in an uplink data frame based on the RTD component of the base station.

15. The subscriber station as recited in claim 14, wherein a gap between the downlink portion of the data received by the receiver module and the uplink portion of the data transmitted by the transmitter module is at least equal to the TTG of the base station.

16. The subscriber station as recited in claim 13, wherein the subscriber station communicates with the base station in compliance with at least one of Institute of Electrical and Electronics Engineers (IEEE) standard 802.16-2004 and IEEE standard 802.16-2005.

* * * * *